United States Patent [19]
McGuire et al.

[11] Patent Number: 5,762,295
[45] Date of Patent: Jun. 9, 1998

[54] DYNAMICALLY OPTIMIZED ENGINE SUSPENSION SYSTEM

[75] Inventors: Dennis P. McGuire, Erie; Gerald P. Whiteford, Waterford; Paul T. Herbst, Erie, all of Pa.; Henry T. Wu, Lisle, Ill.

[73] Assignee: Lord Corporation, Cary, N.C.

[21] Appl. No.: 606,130

[22] Filed: Feb. 23, 1996

[51] Int. Cl.$^6$ .................................................. B64D 27/00
[52] U.S. Cl. ........................... 244/54; 248/550; 248/636; 267/218; 267/140.15
[58] Field of Search ........................ 244/17.27, 54; 248/358, 350, 562, 636, 659, 554–557; 267/140.11, 140.14, 140.15, 140.12; 180/312, 300, 378–380

[56] References Cited

U.S. PATENT DOCUMENTS

| | | | |
|---|---|---|---|
| 2,297,506 | 9/1942 | Schmidt | 248/5 |
| 2,421,585 | 6/1947 | Thiry | 248/358 |
| 2,919,883 | 1/1960 | Murphy | 248/358 |
| 3,018,990 | 1/1962 | Müller | 248/9 |
| 3,132,830 | 5/1964 | Adloff | 248/9 |
| 3,487,888 | 1/1970 | Adams et al. | 244/54 |
| 4,111,386 | 9/1978 | Kenigsberg et al. | 244/17.27 |
| 4,274,510 | 6/1981 | Mouille et al. | 188/1 B |
| 4,416,446 | 11/1983 | Murakami | 267/140.3 |
| 4,638,983 | 1/1987 | Idigkeip et al. | 244/17.23 |
| 4,805,851 | 2/1989 | Herbst | 244/54 |
| 4,811,919 | 3/1989 | Jones | 244/54 |
| 5,156,380 | 10/1992 | Cerruti et al. | 267/293 |
| 5,174,552 | 12/1992 | Hodgson et al. | 267/140.11 |
| 5,176,339 | 1/1993 | Schmidt | 244/54 |
| 5,176,368 | 1/1993 | Shtarkman | 2697/140.15 |
| 5,190,269 | 3/1993 | Ikeda et al. | 267/140.12 |
| 5,197,692 | 3/1993 | Jones et al. | 244/54 |
| 5,251,883 | 10/1993 | Simon et al. | 244/17.27 |
| 5,263,815 | 11/1993 | Brenner | 276/219 |
| 5,273,261 | 12/1993 | Hamberg et al. | 267/140.12 |
| 5,295,670 | 3/1994 | Tsukamoto et al. | 267/140.5 |
| 5,312,093 | 5/1994 | Smith et al. | 267/140.11 |
| 5,330,164 | 7/1994 | Takano et al. | 267/140.14 |
| 5,338,012 | 8/1994 | Kranick | 267/140.5 |
| 5,363,700 | 11/1994 | Joly et al. | 73/504 |
| 5,413,320 | 5/1995 | Herbst | 267/140.13 |
| 5,423,523 | 6/1995 | Gassman et al. | 267/140.15 |
| 5,427,347 | 6/1995 | Swanson et al. | 248/550 |
| 5,526,292 | 6/1996 | Hodgson et al. | 364/574 |
| 5,551,650 | 9/1996 | Southward et al. | 244/54 |

FOREIGN PATENT DOCUMENTS

| | | | |
|---|---|---|---|
| WO 96/12121 | 10/1994 | WIPO | F16F 7/10 |

Primary Examiner—Galen L. Barefoot
Attorney, Agent, or Firm—Randall S. Wayland; James W. Wright

[57] ABSTRACT

A method is described for identifying the primary load path of a particular engine. An elastomeric mount may then be made laterally soft in a first (in the disclosed case, the tangential) direction and more rigid in the direction of the primary load path. Efforts can then be directed to dynamically softening the mount in the primary load path. Specific apparatus may include passive fluid devices, active fluid devices, passive non-fluid devices and active non-fluid devices. In the case of a fluid mount, another feature of the invention is to have an auxiliary fill port of the volume compensator in alignment with at least one and, preferably both, of the primary fill port for the mount and the inertia track to facilitate filling.

21 Claims, 15 Drawing Sheets

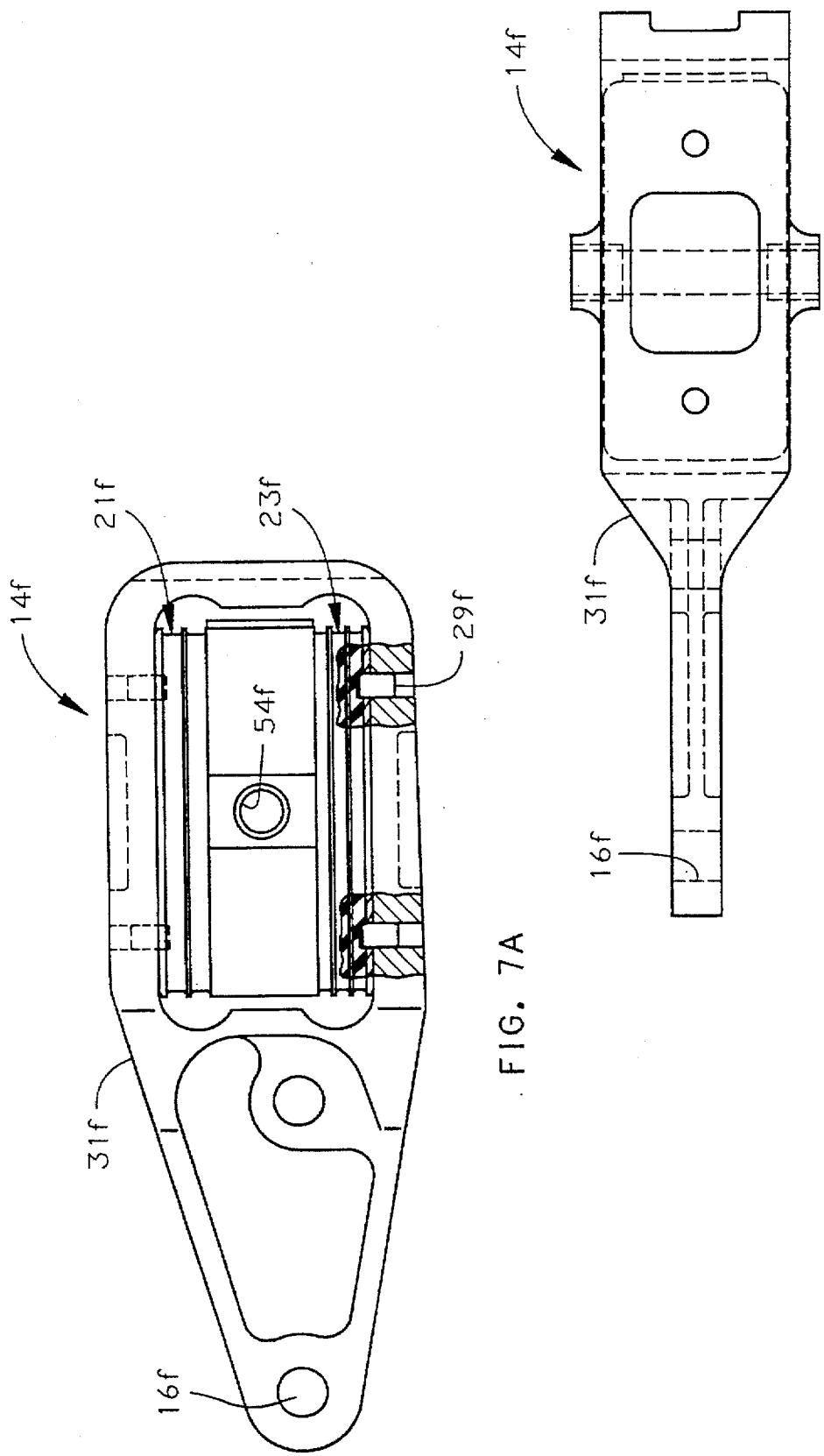

DYNAMICALLY OPTIMIZED ENGINE SUSPENSION SYSTEM

BACKGROUND AND SUMMARY OF THE INVENTION

The present invention deals with vibration isolation systems employing elastomeric mounts. More particularly, the present invention is directed to a method and apparatus for dynamically optimizing a suspension system to improve the isolation characteristics of the mount.

In conventional aircraft engine suspension systems and similar isolation applications, elastomeric isolators are utilized to reduce/minimize transmission of vibrations from the engine to the support structure. A number of factors restrict the effectiveness of these systems. First, only a certain amount of motion of the engine can be tolerated, so the isolation capabilities are sacrificed to provide a mount stiffness that will accommodate these motion restrictions. Second, the elastomeric mount must carry sustained loads resulting from the engine weight, thrust and a variety of in-fight conditions. Accordingly, the mount must have adequate stiffness to accommodate these loads. The demand for more fuel-efficient aircraft leads to the use of higher thrust-per-weight engines and lighter, more flexible, aircraft structures. Accordingly, convential engine mounts may be unable to provide adequate isolation to prevent significant amounts of vibrational energy from being transmitted from the engine into the structure.

In these applications, the problem of isolating the portion of the aircraft structure from the vibrational forces produced by the engine is complicated by the multi-directional nature of the load path, i.e., since the path along which the vibrations propagate has vector components lying along several orthogonal axes, the cancellation effort must provide means to cancel the vibrational forces transmitted along each of these axes. One such device demonstrating means for multi-axis cancellation is described in U.S. Pat. No. 4,962,915 entitled "Three Axis Fluid Filled Mount", and another in commonly assigned copending U.S. application Ser. No. 08/260,945 entitled "Active Mounts for Aircraft Engines", which is hereby incorporated by reference. A patent utilizing fluid effects in conjunction with focalization to control vibration transmission is commonly assigned U.S. Pat. No. 5,413,320 entitled "Fluid Mount for Devices Such As Engines".

The present method and apparatus greatly simplify the cancellation effort. As a first step, the primary load path is determined by test mounting the engine and taking various measurements. Then, by significantly softening the mount statically in at least a first lateral direction orthogonal to a second lateral direction (the primary load path), the cancellation task is made significantly easier. This softening of the mount in a first direction greatly reduces or eliminates the transmission of vibrational forces along that axis. Efforts to improve isolation can then be concentrated upon the second lateral direction in which the mount is stiffer statically for support reasons, by utilizing means to dynamically soften the mount along this axis for a particular range of frequencies of interest.

These softening means may take the form of a) passive non-fluid means, b) passive fluid means, c) active non-fluid means, and d) active fluid means. The softening means is designed to position a notch in the dynamic stiffness vs frequency curve that is centered at a frequency associated with the power plant's operation. In the actively controlled embodiments, means is provided to adjust the notch over a wide range of frequencies.

It is yet another feature of the present invention to provide a fluid mount with a volume compensator which can be more easily filled with fluid. The volume compensator has a fill orifice which is aligned with at least one of the fill orifice for the primary fluid chamber and the inertia track and, in some cases, with both. In this manner, the volume compensator can be filled and plugged through the primary fill orifice and then, the main fluid chambers and inertia track can be filled and the primary fill orifice plugged.

Various other features, advantages and characteristics of the present invention will become apparent after a reading of the following detailed description of the invention.

BRIEF DESCRIPTION OF THE DRAWINGS

Similar reference numerals are used for similar parts throughout the various views in which.

Figure 1A:
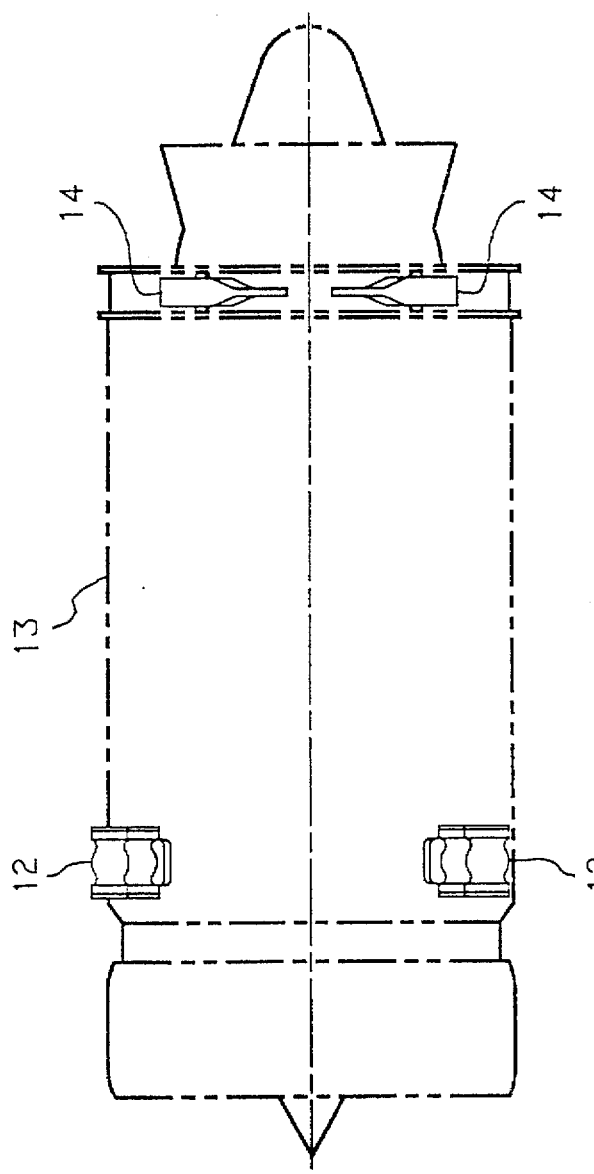
FIG. 1A is a side view of an engine equipped with the vibration isolation mounts of the present invention.
Figure 1B:
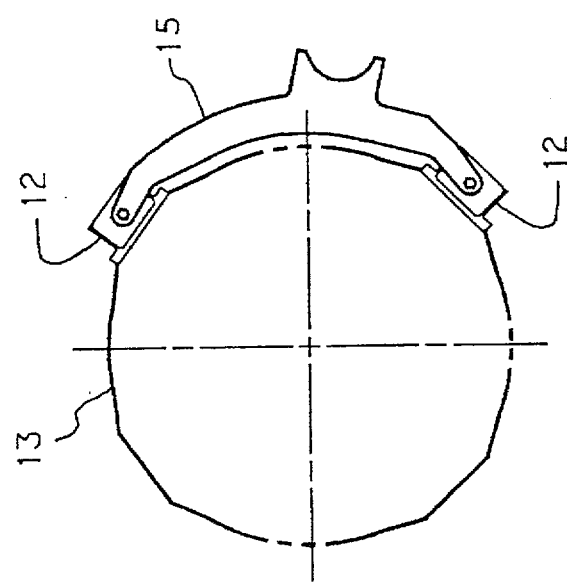
Figure 1C:
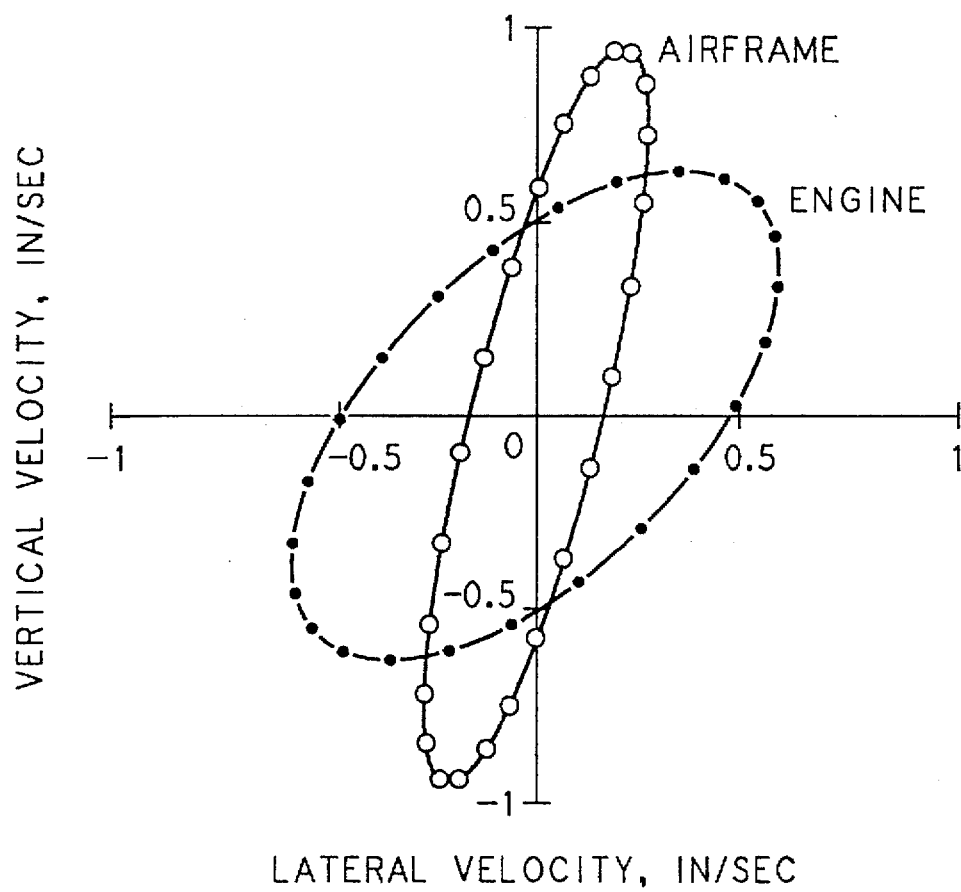
Figure 2A:
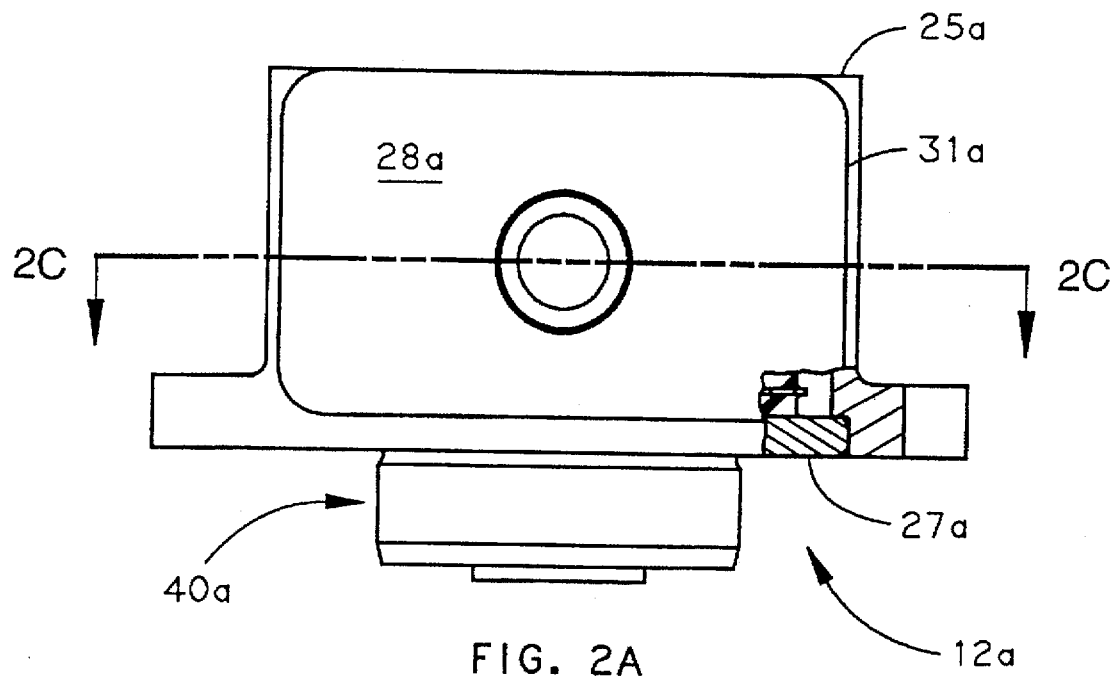
Figure 2B:
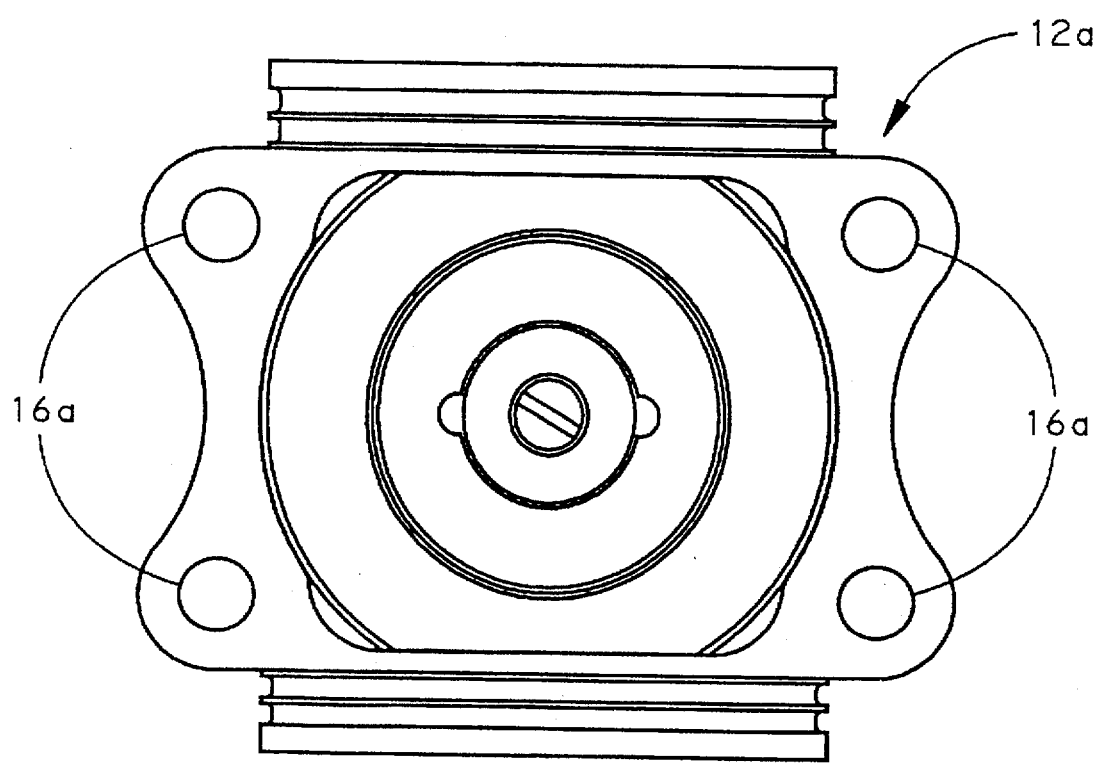
Figure 2C:
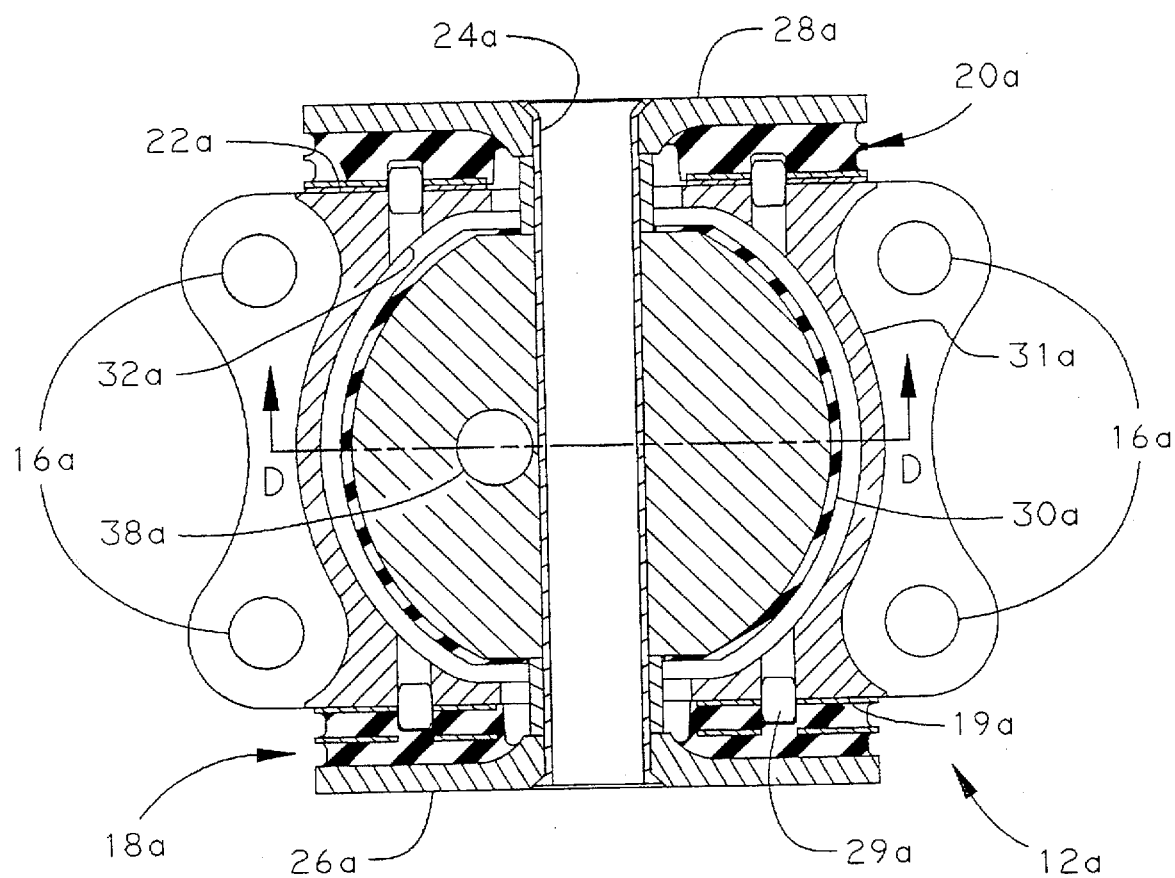
Figure 2D:
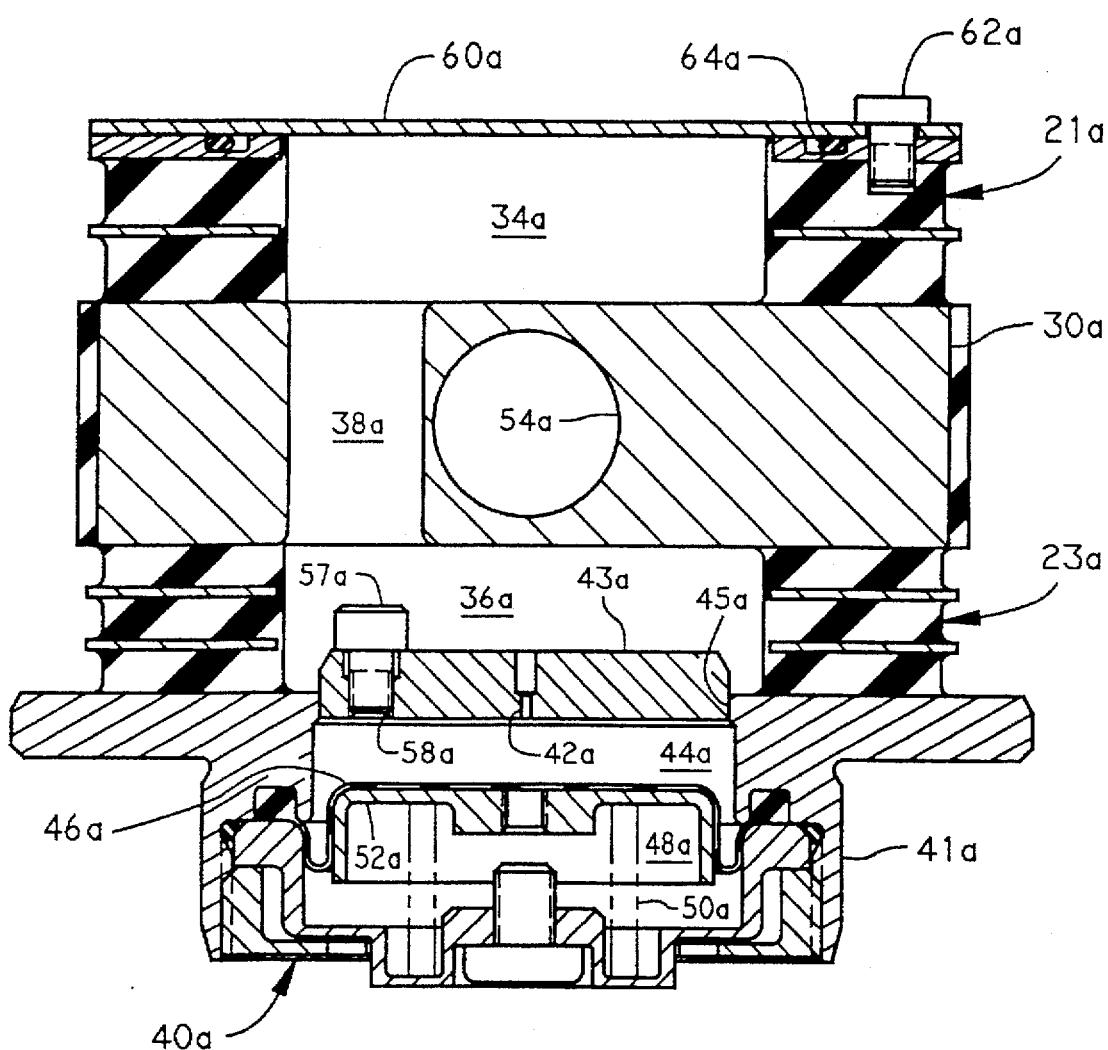
Figure 3A:
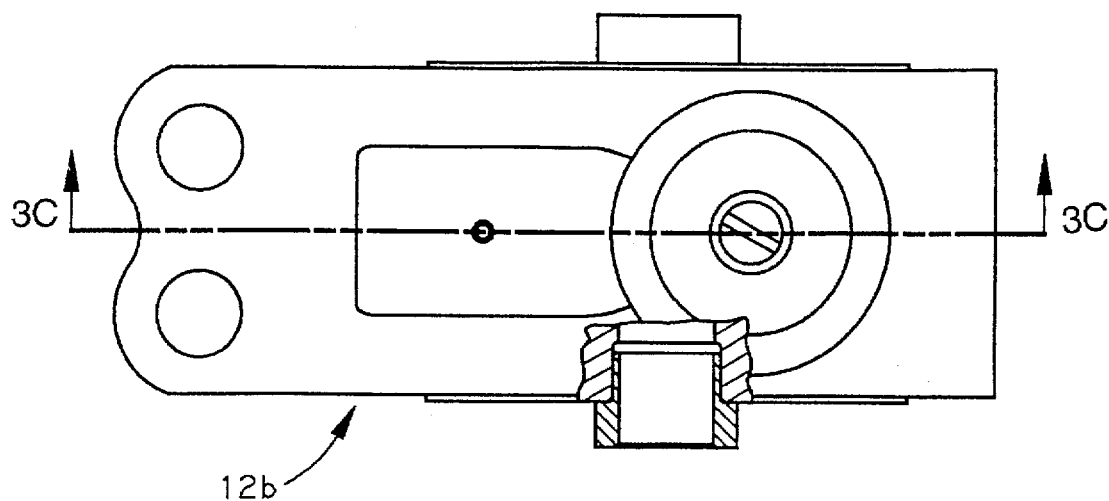
Figure 3B:
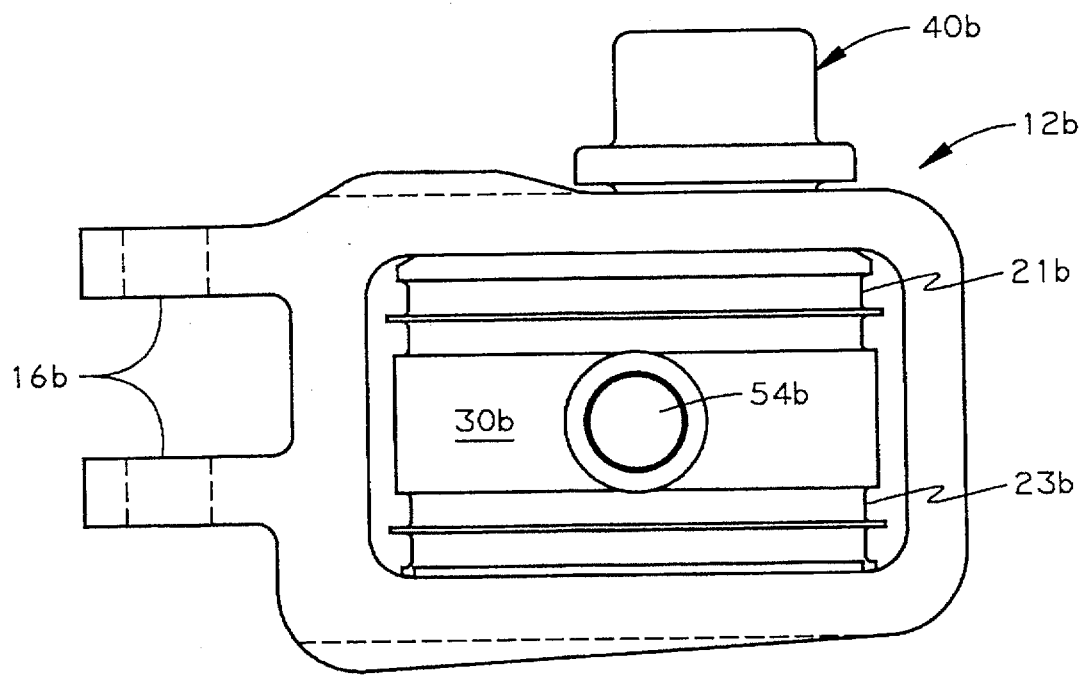
Figure 3C:
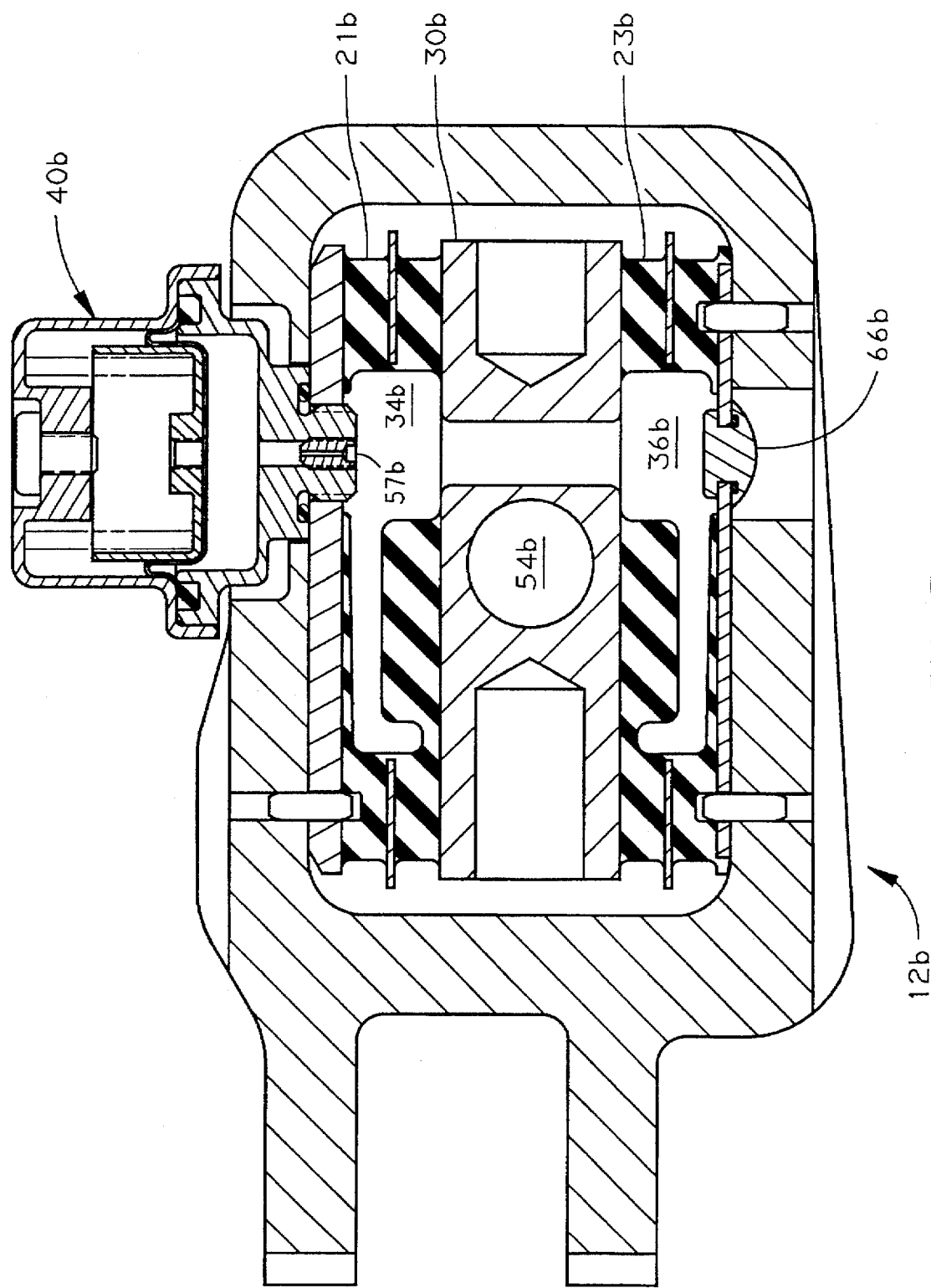
Figure 4A:
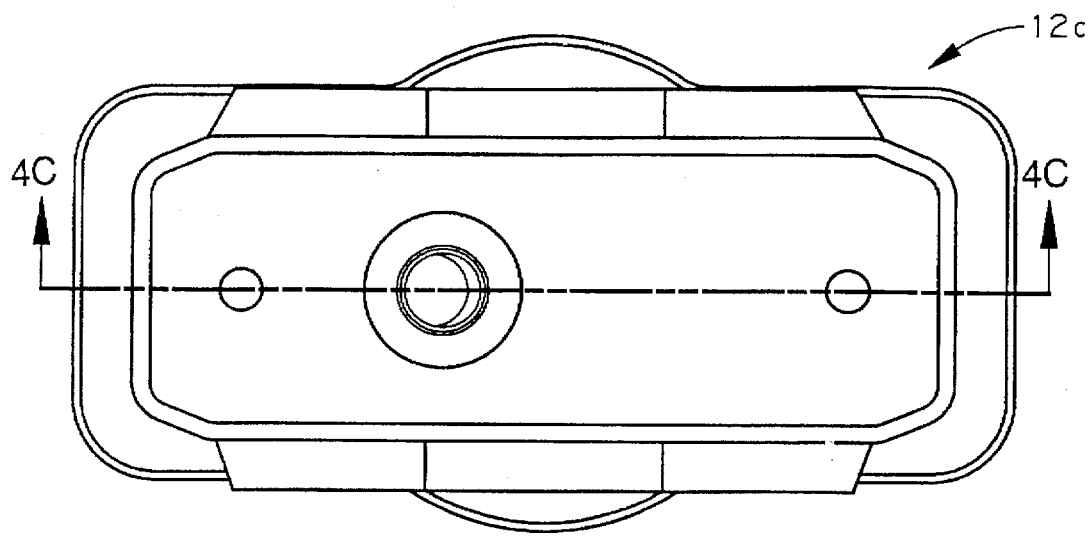
Figure 4B:
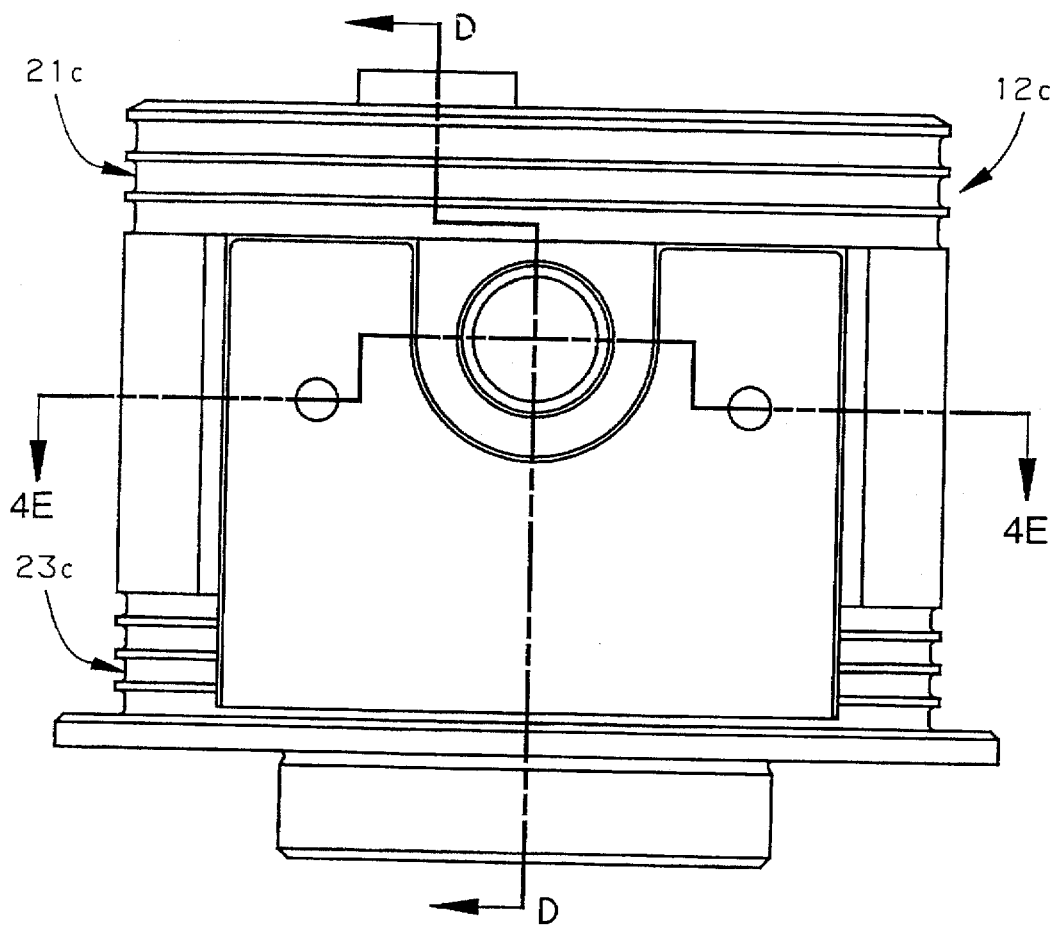
Figures 4C, 4D:
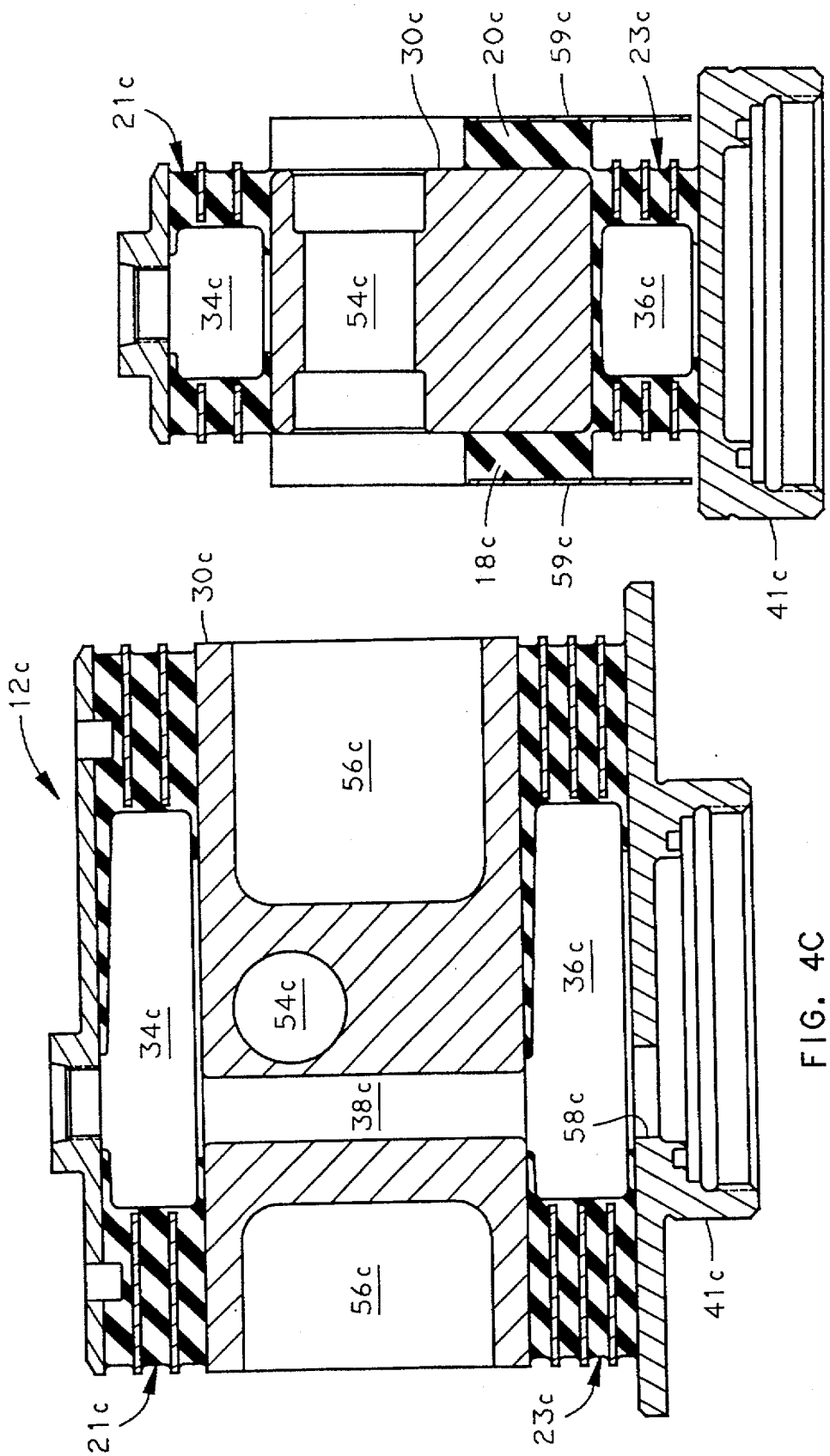
Figure 4E:
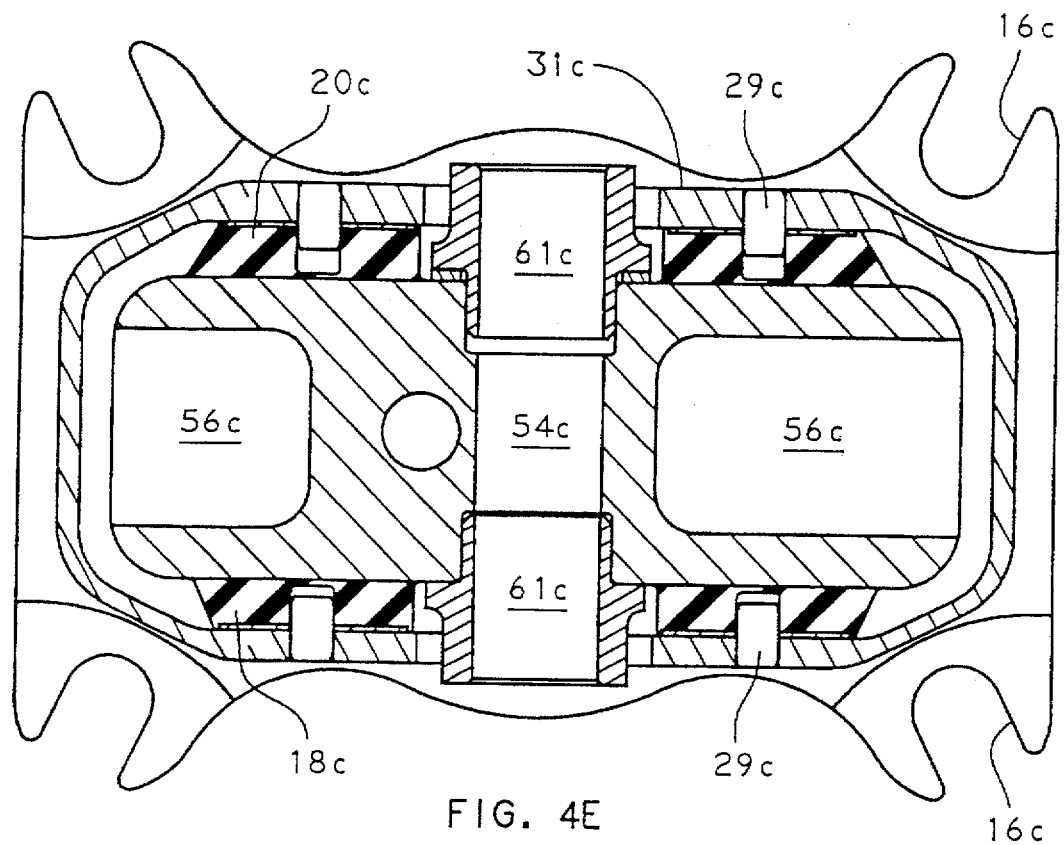
Figure 4F:
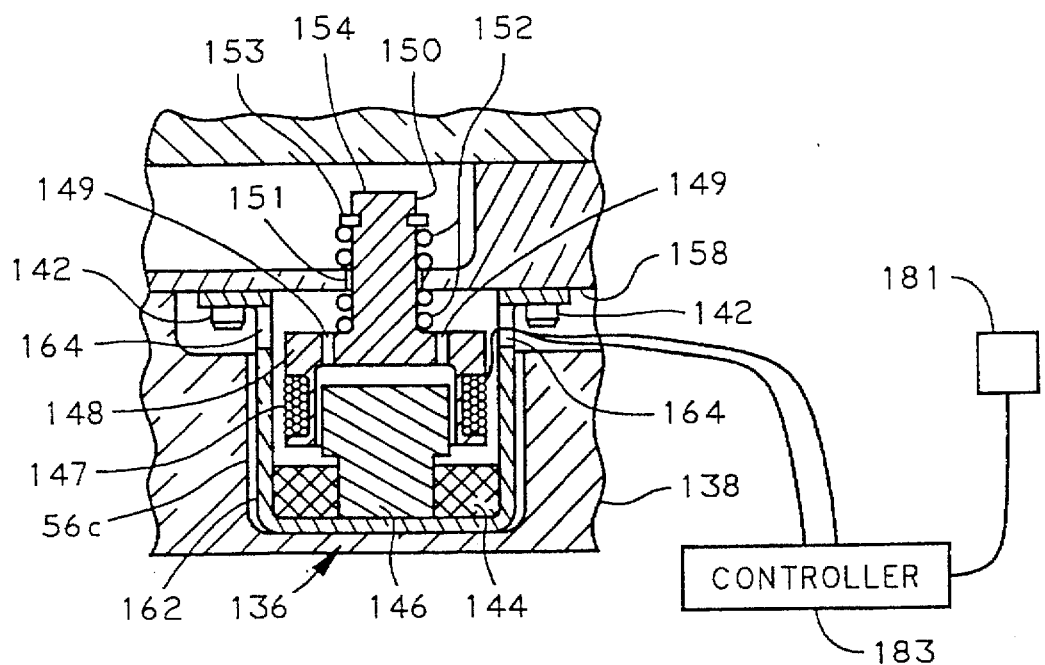
Figure 5:
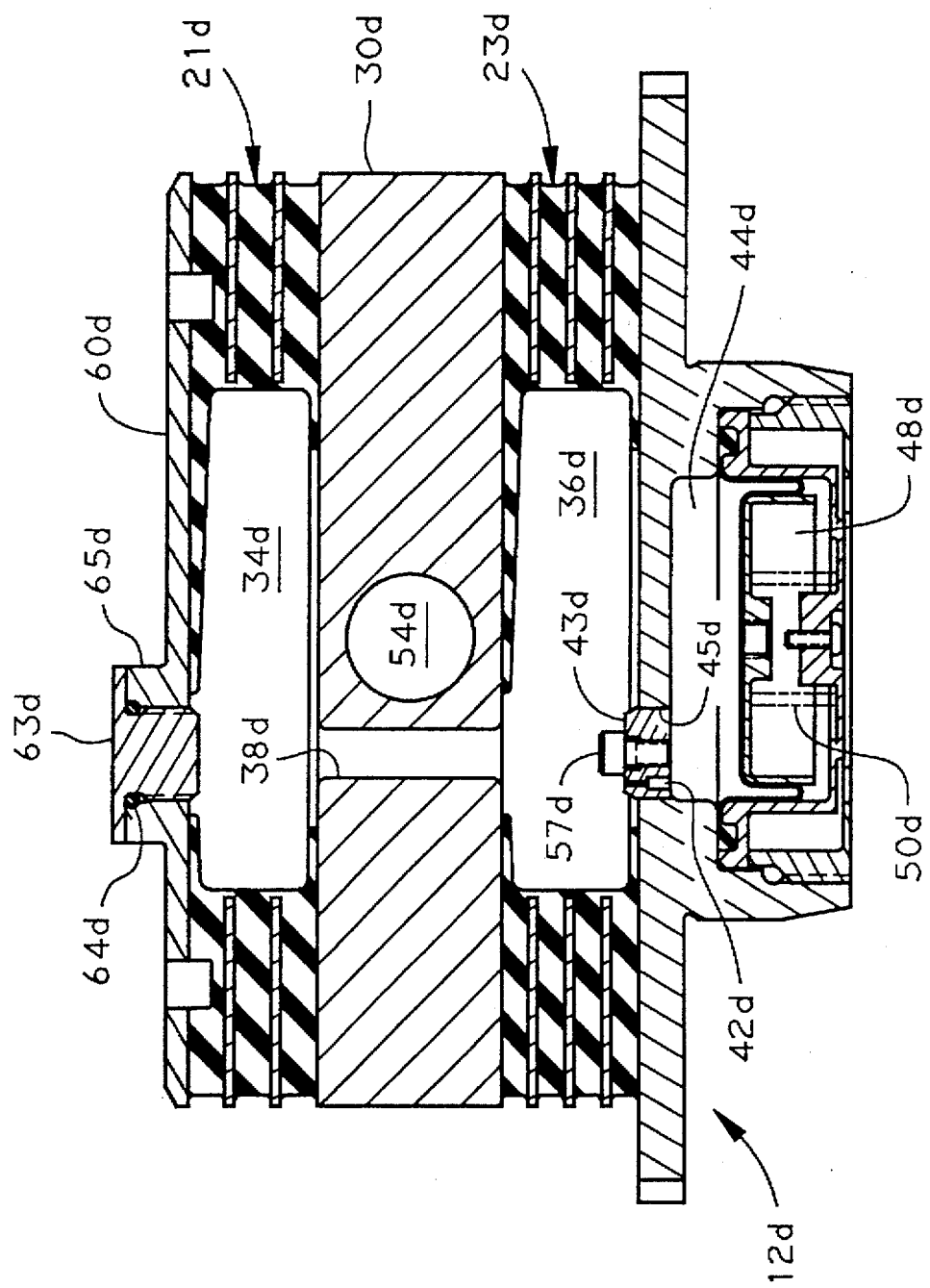
Figure 6A:
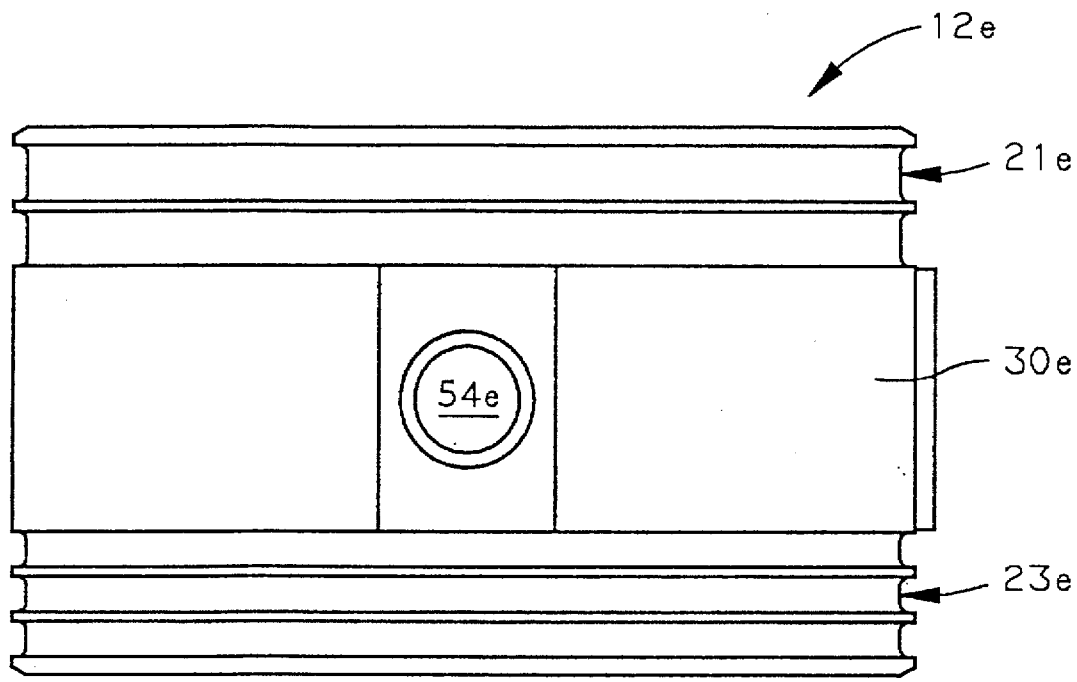
Figure 6B:
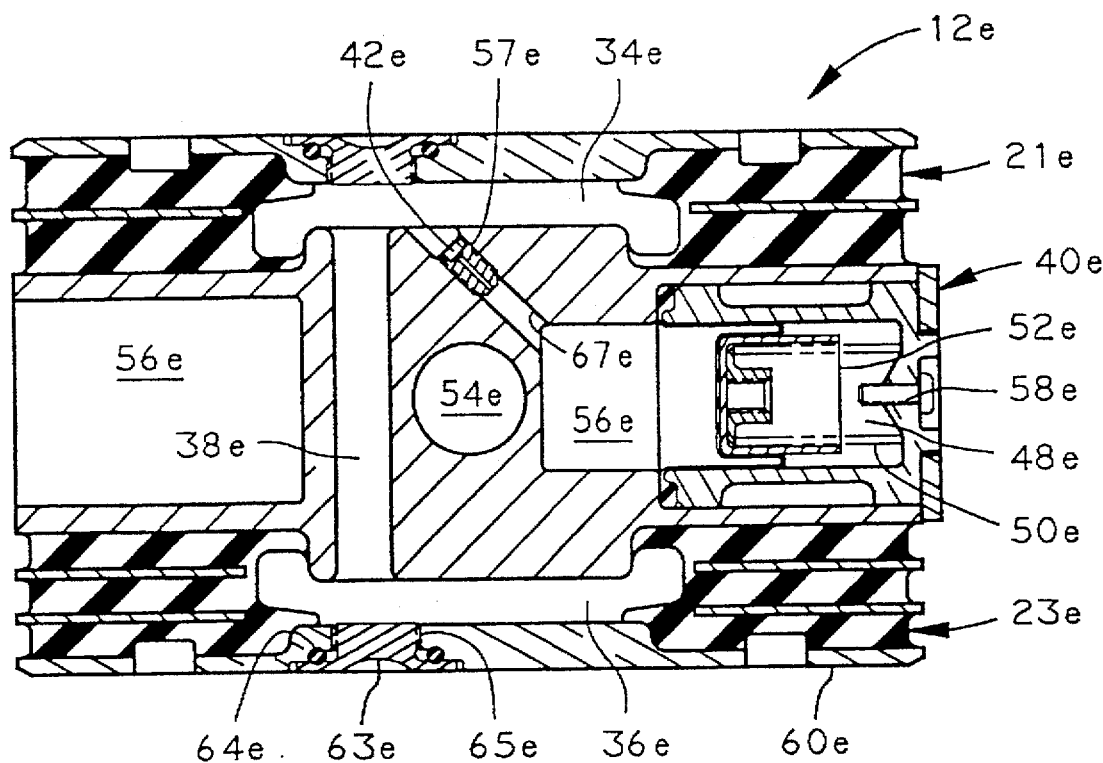
Figure 8A:
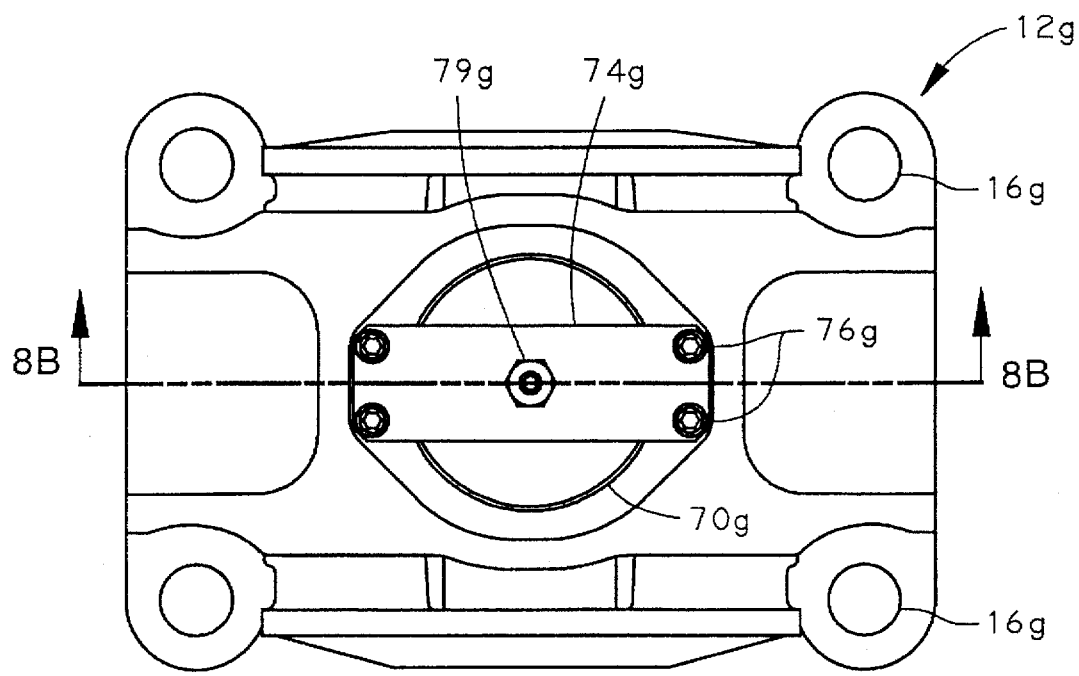
Figure 8B:
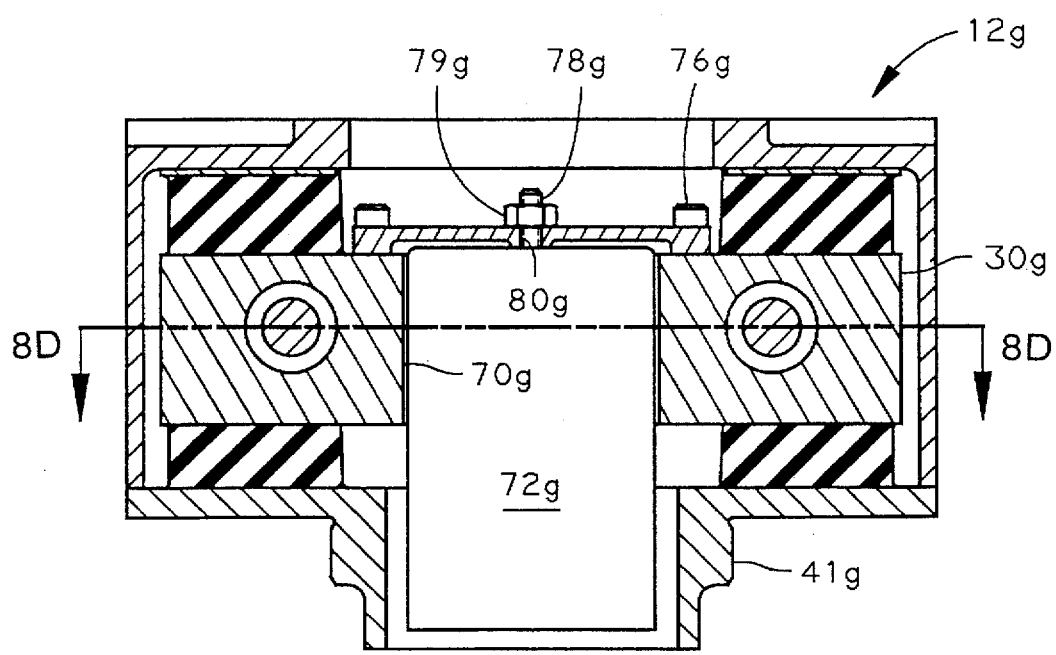
Figure 8C:
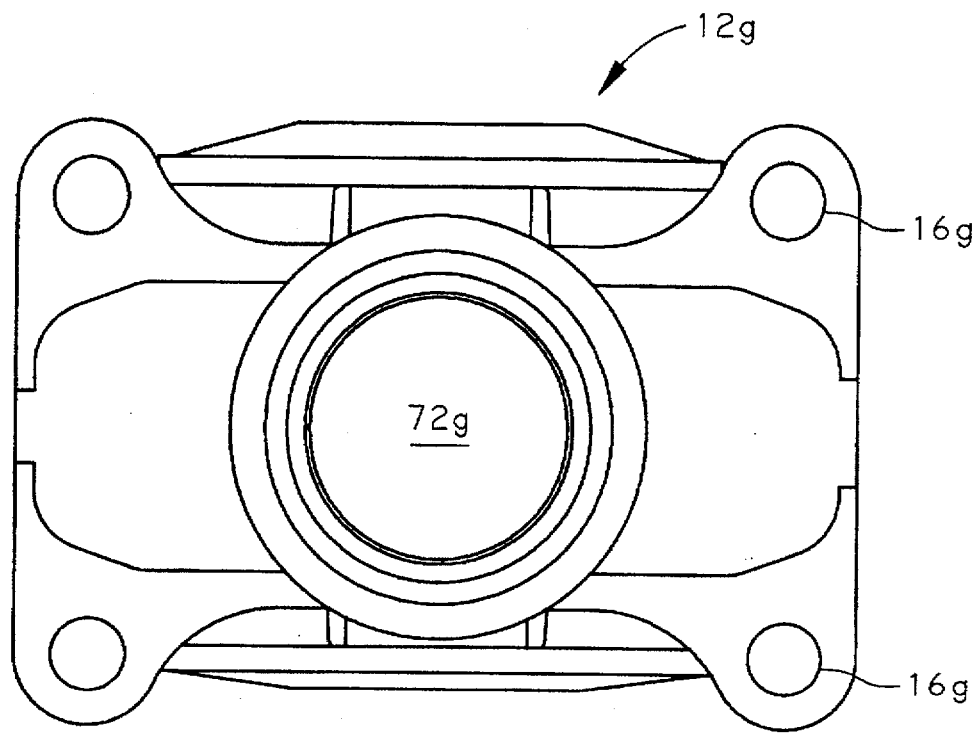
Figure 8D:
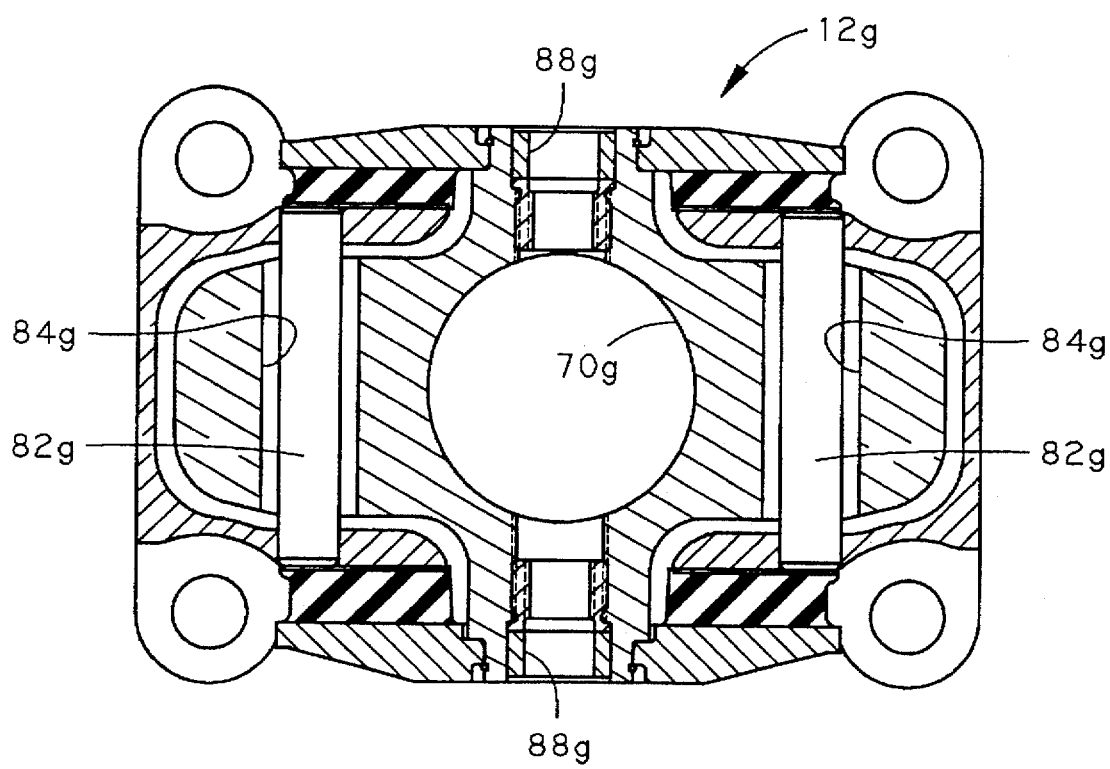

Fig. IB is a front view of the engine shown in FIG. 1A;

FIG. 1C is a graph of vertical velocity vs lateral velocity for both the airframe and engine for a particular test mount configuration;

FIG. 2A is a front view of a first front mount embodying the principles of the present invention;

FIG. 2B is a bottom view of the mount of FIG. 2A;

FIG. 2C is a cross-sectional top view taken along line C—C of FIG. 2A;

FIG. 2D is an enlarged cross-sectional side view of the internal portion of the mount as seen along line D—D of FIG. 2C;

FIG. 3A is a top view of a second embodiment of the front mount of the present invention;

FIG. 3B is a front view of the second embodiment;

FIG. 3C is a cross-sectional front view of the second embodiment as seen along line C—C in FIG. 3A;

FIG. 4A is a top view of the internal portion of a third embodiment of the mount of the present invention;

FIG. 4B is a front view of the device of FIG. 4A;

FIG. 4C is a cross-sectional front view as seen along line C—C of FIG. 4A with elements of the volume compensator removed;

FIG. 4D is a cross-sectional side view as seen along line D—D of FIG. 4B;

FIG. 4E is a cross-sectional top view of FIG. 4B as shown assembled in its housing;

FIG. 4F is an enlarged cross-sectional side view of an actuator which can be utilized to make the system active;

FIG. 5 is a cross-sectional side view of the internal portions of a fourth embodiment of a front mount made in accordance with the present invention;

FIG. 6A is a front view of the internal portions of a fifth embodiment of a front mount made in accordance with the present invention;

FIG. 6B is a cross-sectional front view of the internal portions of the fifth embodiment;

FIG. 7A is a front view with portions broken away of an aft engine mount embodying the principles of the present invention;

FIG. 7B is a bottom view of the rear mount embodiment shown in FIG. 7A;

FIG. 8A is a top view of a non-fluid mount in accordance with the present invention;

FIG. 8B is a front view in partial section as seen in FIG. 8A along line B—B; FIG. 8C is a bottom view of the mount of FIG. 8A; and FIG. 8D is a cross-sectional top view as seen along D—D of FIG. 8B with the actuator removed for clarity.

DETAILED DESCRIPTION OF THE PREFERRED EMBODIMENTS

FIGS. 1A and 1B indicate the positions of front mounts 12 and rear mounts 14 relative to power plant 13. Mounts 12 and 14 are designed to attach power plant 13 to a support beam 15 which is, in turn, attached to the aircraft's fusilage (not shown). In implementing the principles of this invention, initial testing is performed on the power plant 13 to determine its primary axis of vibration transmission. In the present instance, the primary trans-mission axes extend along two pairs of radial axes of the power plant 13 into mounts 12 and 14. Such information can be deduced from the graph in FIG. 1C in which the power plant in question was suspended by a conventional elastomeric mount which did not exhibit the directional softness which characterizes the present invention. The primary axis of the ellipse defining the loci of points on the vertical velocity vs horizontal velocity graph resulting from motion of the engine has a slope of 1 suggesting a radial transmission axis which is flattened into an ellipse by the lateral stiffness of the combined airframe and mount.

Since this engine has been determined to have a primary load path lying along the radius of the engine, each mount 12, 14 can be designed to be statically soft in a first lateral (non-thrust) direction tangential to the power plant 13 (i.e., to have an elastomeric portion with a low shear stiffness). The mount is designed to have a higher static spring rate in the second lateral direction lying along the primary transmission path, with the elastomer loaded in compression and the particular spring rate related more to the weight support requirements than to the vibration isolation desired. Typically, the aft mount 14 will be designed to also be soft in the thrust direction so the primary thrust load is transmitted through the front mount 12.

By way of example and not limitation, front mount 12 may be designed with the following static spring rates:

$K_{fla}$=1225.9 DaN/mm [70,000 lb/in]

Krad=665.5 DaN/mm [38,000 lb/in]

$K_{tan}$=96.3 DaN/mm [5500 lb/in]

where $K_{fla}$ is the static spring rate in the fore and aft direction, Krad is the static spring rate in the radial direction and $K_{tan}$ the static spring rate in the tangential direction.

Similarly, the aft mount 14 may have, for example, the following static spring rates:

$K_{fla}$=61.3 DaN/mm [3500 lb/in]

Krad=612.9 DaN/mm [35,000 lb/in]

$K_{tan}$=61.3 DaN/mm [3500 lb/in]

The aft mount is designed to accept axial loading in shear (where the front mount is loaded in the fore and aft direction in compression) and is soft in shear to enable movement of the engine relative to the fusilage due to thermal expansion without loading the fusilage.

A first embodiment of a forward mount of the present invention is depicted in FIGS. 2A–D generally at 12a.

Forward mount 12a is attached to power plant 13 (FIG. 1A) by securing bolts through bolt holes 16a. A first elastomeric sandwich 18a is clamped against the forward surface 19a of mount 12a and a second elastomeric sandwich 20a is clamped against the aft surface 22a by sleeve 24a. Sleeve 24a is attached to surface plates 26a and 28a, as by swaging, or the like, plates 26a and 28a being laminated to the outer elastomeric surfaces of sandwiches 18a and 20a, respectively. A plurality of pins 29a are used to transmit tangential and radial shear from engine 13 (via the housing 31a) through pins 29a to sandwich elements 18a and 20a and then through plates 26a and 28a, to sleeve 24a and finally to support 15 by the mount's attachment bolt. A truncated-spherical (in cross section) piston element 30a is attached to sleeve 24a and moves within a similarly cross-sectioned chamber 32a in housing 31a acting as a piston to pump fluid between upper (34a) and lower (36a) chambers (FIG. 2D) through inertial track 38a.

A third elastomeric sandwich element 21a is bonded to portions of the upper surface of the piston 30a and a fourth sandwich element 23a is bonded to the bottom portions of piston 30a. By comparing FIGS. 2C and 2D, the variations in spring rates can be explained. The tangential direction (across each Figure) has the softest spring rate because each of the four sandwich elements 18a, 20a, 21a and 23a is loaded in shear. The compressive stiffness of sandwich elements 18a and 20a in the fore and aft direction, will be designed to be roughly twice that of the elements 21a and 23a on the top and bottom, the spring rate of the former being a function of the thrust of the engine and the spring rate of the latter a function of the engine's weight.

A volume compensator 40a is positioned within pilot 41a and connected to one of the fluid chambers 34a, 36a and inertia track 38a by means of an isolation orifice 42a, shown here as being formed in plug 43a which is press fit into opening 45a. Isolation orifice 42a is of such a size as to dynamically isolate fluid chamber 44a of compensator 40a from the primary fluid system. Orifice 42a permits fluid displaced from the primary fluid system due to thermal expansion of the fluid to enter chamber 44a. An elastomeric bladder 46a separates fluid chamber 44a from pressurized pneumatic chamber 48a . Optionally, a coil spring 50a may assist the applied fluid pressure in supporting the piston 52a. While spring 50a is shown in FIG. 2D as helically wound, it may alternatively be conically wound to permit better collapsibility and optimize the use of space. Sleeve 24a is received in opening 54a in truncated spherical element 30a. A through bolt (not shown) inserted through sleeve 24a attaches element 30a to support beam 15.

A plug 57a is threaded into orifice 58a which is the fill port for volume compensator 40a. Filling compensator 40a through isolation orifice 42a is not practical or possible because of its size, hence the use of fill port 58a. It is a feature of the present invention that fill port 58a is in alignment with at least one of the inertia track 38a and the primary fill port (if any) for the primary fluid system. Accordingly, chamber 44a can be filled with fluid, a tool inserted through inertia track 38a to install plug 57a, the main fluid chambers 34a, 36a, 38a filled and the primary fill port plugged. In the FIG. 2A–D embodiment, face plate 60a is fastened in place using a plurality of bolts 62a to close the primary fill port (open top of chamber 34a) compressing O-ring 64a to seal the fluid into chamber 34a.

In operation, front mount 12a will be attached to engine 13 by bolts through apertures 16a and to support beam 15 by a bolt through sleeve 24a. Vibrations of engine 13 will be isolated from the support beam 15 by the relatively soft spring rate of the elastomer of sandwich elements 18a, 20a, 21a, 23a in shear for tangentially directed vibrations. The compressive spring rate of the elastomer in sandwiches 21a and 23a is sufficient to provide the support for the engine in the radial direction without undue engine deflection. As the engine 13 and mount 12a move relative to piston 30a and support beam 15, alternately compressing elastomer sandwiches 21a and 23a against upper (25a) and lower (27a) walls of housing 29a, fluid will be pumped between chambers 34a and 36a through the inertia track 8a. This slug of fluid in the primary fluid system can be designed to resonate at a particular operational frequency that will effectively dynamically soften the elastomer thereby reducing the vibration transmitted across the mount at or near resonance.

The primary fluid system will be tuned to provide a dynamic softness, or notch, usually at the primary operational frequency, $N_1$, of the engine. Tuning of the passive fluid system is done by varying the relevant parameters including density of the fluid, length and diameter of the passageway 38a, and volume stiffness of the primary fluid system. Tuning this dynamic stiffness notch to coincide with the primary vibrational input frequency will reduce the vibration transmitted at this most troublesome frequency. Mount 12a will have an effective dynamic stiffness in both the tangential and radial directions that will generally fall in the 122.6–140.1 DaN/mm (7000–8000lb/in) range for the static stiffnesses described above at the $N_1$ tone. This will optimize isolation of the mount by minimizing the vibration transmitted across the mount.

A second embodiment of the forward mount of the present invention is depicted in FIGS. 3A–C generally at 12 b. Forward mount 12b is attached to support structure (not shown) by a securing bolt received in openings 16b. Mount 12b is secured to engine 13 by attaching a securement bolt (not shown) through opening 54b in piston 30b. Volume compensator 40b is mounted on the top of mount 12b. While this mount embodiment may be filled in accordance with the method described in conjunction with the first embodiment finally inserting pop rivet plug 66b (FIG. 3C), it may prove simpler to fill the volume compensator, insert the valve-containing plug 57b, install pop rivet 66b, fill chambers 34b, 36b, and inertia track 38b, and simply invert the compensator 40b and thread it into plate 60b. A further distinction of this embodiment is that chambers 34b and 36b have more exotic shapes and provide an elastomeric coating for most internal metallic surfaces.

A third embodiment is shown in FIGS. 4A–E generally at 12c. This third embodiment 12c exhibits a configuration similar to that of the first embodiment 12a having cavities 34c and 36c. Sandwich elements 18c and 20c are bonded to the sides of piston 30c as opposed to simply being clamped to the exterior. Skirt 59c is formed on the outside of sandwich elements 18c and 20c to facilitate their manufacture. The internal portion of mount 12c can be dropped into housing 31c and pinned in place by pins 29c, bushings 61c installed in the front and aft portions of opening 54c, and mount 12c secured to engine 13 using slots 16c. The volume compensator may be installed in pilot 41c as in the first embodiment.

A fourth embodiment of the mount of the present invention is shown in FIG. 5 generally at 12d having cavities 34d and 36d. Plug 43d, which is press fit into opening 45d, is much smaller in this embodiment and has isolation orifice 42d and a threaded passageway for receiving fill plug 57d formed therein. In addition, fill plug 63d for the main chambers 34d and 36d with inertia track 38d can be threaded into extruded port 65d compressing O-ring 64d to seal port 65d.

A fifth embodiment of the mount of the present invention is depicted in FIGS. 6A and 6B generally at 12e. Key differences from previously described embodiments include the inclusion of volume compensator 40e in one of the weight reduction cavities 56e eliminating the need for a separately formed pilot. In addition, since piston 52e is considerably smaller and oriented horizontally, spring 50e need not support its full weight nor the weight of its associated fluid. Accordingly, depending upon the level of pressurization required in the primary fluid system, chamber 48e may be opened to the atmosphere. If additional pressurization is necessary, chamber 48e can be pressurized and opening 58e plugged. Another feature which differs is the positioning of orifice-containing (42e) plug 57e in an auxiliary passageway 67e accessible through port 65e without having to reach a tool through inertia track 38e.

It will be appreciated that the isolation available with passive fluid systems is generally limited to a single frequency or band of frequencies. Vibrations transmitted at frequencies of operation outside that band will be reduced by passive fluid systems but to a much lesser extent. Accordingly, it is contemplated that an actuator could be added to the primary fluid system in order to effectively move the notch to correspond with the frequency of operation of the engine at any particular moment.

The benefits as well as the particulars of such a system are described in commonly assigned U.S. Pat. No. 5,174,552 entitled "Fluid Mount with Active Vibration Control", which is hereby incorporated by reference. FIG. 4F is FIG. 6 of the abovenoted patent with a '1' prefix used on common reference numerals. Actuator 136 is shown in FIG. 4F as positioned in an auxiliary housing 138. Auxiliary housing might take the form of a cover for a weight reduction cavity 56c in piston 30c with actuator 136 extending into inertia track 38c. Actuator 136 can be fastened in place by bolts 142. In this embodiment, actuator 136 is depicted as an electromagnetic actuator featuring magnet 144, pole piece 146, voice coil 148, spool 150 with centering springs 152.

The centering spring nearest the spool end 154 reacts against and is retained by circlip 153. Actuator 136 may be sealed in an opening 56c by an O-ring (not shown) and communicate with auxiliary chamber 36c through passageway 158. Spool 150 is received in a self-lubricating bushing 151 which may be made of Rulon® plastic, or the like. The laterally extending surface of voice coil 148 has a plurality of holes 149 therethrough to permit free flow of fluid within the actuator 136. Without holes 149, movement of voice coil 148 would be restricted due to trapping of the fluid between coil 148 and pole piece 146. Conductive wire 147, usually copper, forms the windings of voice coil 148.

An electromagnetic actuator of the type suitable for this application can be purchased from the *Kimco Division of BEI Motion Systems in San Marcos*, Calif. Housing 162 will be sealed within cavity 56c by an enclosing wall of auxiliary housing 138. A plurality of openings 164 in housing 162 provide fluid access between the voice coil 148 and passageway 158. By varying the flow of current passing through voice coil 148, the strength and direction of magnetic field induced within the windings of coil 148 can be varied to change the position of coil 148 relative to pole piece 146. Spool 150 will "pump fluid" in response to movement of coil 148 resulting in energy being input into the fluid in chamber 36c altering the rate of fluid oscillation in the system.

By properly controlling the rate of movement of spool 150, the passively generated forces of the mount (e.g., the damping forces of the elastomer sandwich elements 21c and 23c and resistance to fluid flow in the system), can be counteracted to drive the dynamic stiffness of the mount to zero. A sensor 181 may be mounted on engine 13 or the like to provide an input signal indicative of the disturbance signal to controller 183. Controller 183 employs information about the disturbance signal to adjust the rate of movement of spool 150 to counter the vibrational input of the engine. Error sensors (not shown) may be used to further tweak the controller output signal to voice coil 148.

Accordingly, regardless of the magnitude of the vibration of the disturbance source at this notch frequency (or any frequency where the dynamic stiffness can be made zero), no vibrational forces will be transmitted from the source across the mount to the airframe, since the magnitude of the steady-state force transmitted is a product of the dynamic stiffness (in this case, zero) and the displacement. Note, however, that it is not desirable to create a dynamic stiffness of zero at low frequencies coinciding with wing-flapping and engine-bounce modes of vibration. Leakage across bushing 151 can be designed to limit the ability of the mount to generate forces at frequencies below a critical design frequency (e.g., below about 5–10 Hz).

An aft mount embodying the features of the present invention are depicted in FIGS. 7A and 7B generally at 14f. Housing 31f is bolted to the frame using bolt holes 16f and the mount is affixed to the engine through throughbore 54f. The internal portions of mount 14f are virtually identical to those shown in FIG. 6B and have not been replicated here. The internal portion is pinned into housing 31f by shear transmission pins 29f. As the engine 13 moves radially along the primary load path, the piston 30f will alternately compress elastomeric sandwich elements 21f and 23f pumping fluid between upper and lower chambers (not shown) through a connecting inertia track. The resulting fluid-inertia effect will dampen the vibration transmitted across the mount as discussed relative to the embodiments of the forward mounts 12. Of course, the principles of the passive non-fluid and active fluid and active non-fluid configurations discussed in conjunction with the forward mount can be incorporated into the aft mount 14, as well.

It will be appreciated that the objectives of the present invention can also be achieved by non-fluid embodiments. Such an embodiment is presented in FIGS. 8A–D. Piston 30g has an axial bore 70g extending therethrough. Actuator 72g is suspended by bracket 74g from the upper surface of piston 30g using bolts 76g. Actuator rod 78g of the actuator 72g extends through a hole 80g in bracket 74g and has a nut threaded 79g thereon. A pair of rods 82g extend through oversized holes 84g in piston 30g. Tangential and radial motions will be snubbed by the engagement of rods 82g with the sides of their respective holes 84g. Because of the presence of actuator 72g through the center of piston 30g, the throughbolt which ordinarily is used to connect mount 12g to the support 15 is replaced by a pair of stub shafts (not shown) threaded into recesses 88g.

A suitable actuator is available from Moog as C10193-1. This actuator 72g is, in effect, a tuned vibration absorber; that is, when the actuator is not turned on, it will still produce a notch at the $N_1$ frequency, by design. When turned on, actuator 72g will be able to produce a cancellation frequency over a range of input disturbance frequencies as was the case with the active fluid embodiment. Actuator 72g functions as an inertial nonfluid mass which will resonate at a design frequency (usually $N_1$) to produce an out-of-phase inertial effect sufficient to cancel the vibrational input from engine 13 associated with the primary input therefrom. When actuator 72g is activated responsive to a sensor, its operational frequency can be varied over the suggested range to provide out-of-phase cancelling vibrations extending over the operational frequency range of the engine.

Various changes, alternatives and modifications will become apparent to a person of ordinary skill in the art after a reading of the foregoing description. It is intended that all such changes, alternatives and modifications as come within the scope of the appended claims be considered part of the present invention.

What is claimed is:

1. Apparatus for mounting a turbine engine to a portion of an aircraft structure, said apparatus comprising
   a) a first elastomeric mount attachable to said engine and said portion of an aircraft structure, said mount being significantly softer statically in a first lateral direction than in a second lateral direction said mount having a static spring rate in said first lateral direction which is generally 10% or less of the static spring rate in said second lateral direction and having a third static spring rate in a third orthogonal direction that is about one half or less of said spring rate in said second lateral direction, said second lateral direction defining a primary load path for transmission of vibratory forces from said turbine engine to said portion of an aircraft structure;
   b) auxiliary means associated with said second lateral direction to dynamically soften said mount in said second lateral direction to reduce or cancel vibratory forces transmitted between said engine and said portion of an aircraft structure, wherein said auxiliary means is selected from the group consisting of i) passive non-fluid means, ii) active non-fluid means, and iii) active fluid means.

2. The apparatus of claim 1 wherein said mount is a front engine mount for said turbine engine and said primary load path extends generally parallel to a longitudinal axis of said turbine engine.

3. The apparatus of claim 1 wherein said first lateral direction is tangential to said turbine engine and is statically soft by virtue of loading said elastomeric mount in shear whereby tangential vibrations are effectively isolated by virtue of said elastomeric mount's static softness.

4. The apparatus of claim 1 wherein said mount is an aft mount for said turbine engine and said primary load path extends generally radially to a longitudinal axis of said turbine engine.

5. The apparatus of claim 1 wherein said auxiliary passive non-fluid means comprises a tuned vibration absorber tuned to a typical operating frequency of said turbine engine.

6. The appartatus of claim 1 wherein said auxiliary means comprises auxiliary fluid means including first and second fluid chambers interconnected by a fluid-containing inertia track and a volume compensator attached to at least one of i) said first fluid chamber, ii) said second fluid chamber, and iii) said inertia track.

7. The apparatus of claim 1 wherein said elastomeric mount comprises a first set of elastomeric sandwich elements having a compressive stiffness oriented in said second lateral direction and a second set of elastomeric sandwich elements having a compressive stiffness oriented in said third orthogonal direction.

8. The apparatus of claim 6 wherein a fill port for said volume compensator is axially aligned with at least one of a fill port for said first and second chambers and said inertia track.

9. The apparatus of claim 6 wherein a fill port and associated passageway for said volume compensator is adjacent to said inertia track and may be plugged from a fill port for said first and second chambers.

10. The apparatus of claim 1 wherein said auxiliary active non-fluid means comprises i) an actuator connected between said engine and said portion of an aircraft structure, ii) a sensor to determine a frequency of an input disturbance vibration, and iii) a controller to output a cancellation signal of suitable frequency, phase and amplitude to substantially cancel said input disturbance.

11. The apparatus of claim 1 wherein said elastomeric mount comprises a double-acting fluid mount having a first fluid-containing chamber, a second fluid-containing chamber separated from said first chamber by a piston, and an inertia track interconnecting said first and second chambers, said piston pumping fluid to and from said second chamber from and to said first chamber and a volume compensator attached to at least one of said first fluid-containing chamber, ii) said second fluid-containing chamber, and iii) said inertia track.

12. The apparatus of claim 11 wherein said inertia track passes through said piston.

13. The apparatus of claim 11 wherein said auxiliary active fluid means comprises an actuator vibrating said fluid between said chambers through said inertia track to reduce a dynamic stiffness of said mount to substantially zero effectively isolating said portion of an aircraft structure from said engine.

14. The apparatus of claim 1 wherein said auxiliary active fluid means comprises i) at least one chamber which contains fluid, ii) a fluid-containing inertia track interconnected to said at least one chamber, iii) an actuator vibrating said fluid within said chamber and said inertia track to reduce a dynamic stiffness of said mount to near zero in said second lateral direction effectively isolating said portion of an aircraft structure from vibrations produced by said engine along said second lateral direction.

15. The apparatus of claim 14 further comprising a sensor for detecting an input frequency of an input disturbance vibration and a controller for providing a control signal for said actuator to adjust said dynamic stiffness of said mount responsive to said input frequency.

16. The apparatus of claim 1 further comprising at least two additional elastomeric mounts attached between said engine and said portion of an aircraft structure, said additional elastomeric mounts having features similar to said first mount.

17. A double-acting fluid mount comprising:
a) a first chamber for containing fluid;
b) a second chamber for containing fluid,
c) an inertia track interconnecting said first and second chambers and together therewith, defining a fluid-containing volume;
d) a volume compensator associated with fluid-containing volume and having a secondary fill port which is to be plugged with a stopper having an orifice which dynamically locks out said volume compensator from said fluid-containing volume, yet permits excess fluid to pass through said orifice into said volume compensator;
e) a primary fill port for filling said fluid-containing volume, said primary fill port being aligned with said volume compensator fill port;
whereby said volume compensator may be filled and plugged through said primary fill port prior to filling said fluid-containing volume with operating fluid.

18. The double-acting fluid mount of claim 17 wherein said primary fill port is in alignment with both of said inertia track and said secondary fill port.

19. A method of reducing a level of vibratory force transmitted by an engine to a portion of an aircraft structure, said method comprising:
a) determining a primary axis of vibration of said engine by test-mounting said engine with a plurality of sensors to measure force transmissions;
b) developing an elastomeric mount which is statically soft in a first lateral direction orthogonal to said primary axis and is comparatively statically stiff along a second lateral direction which is coaxial with said primary axis including designing said mount to have a static spring rate in said first lateral direction which is generally 10% or less of the static spring rate in said second lateral direction and a third static spring rate in a third orthogonal direction that is about one half or less of said spring rate in said second lateral direction;
c) interconnecting said engine with said portion of an aircraft structure using said elastomeric mount such that said primary axis lies along a primary load path;
d) providing an auxiliary means associated with said second lateral direction to dynamically soften said elastomeric mount in said second lateral direction to reduce said level of vibratory force transmitted by said engine to said portion of an aircraft structure along said second lateral direction, said static softness in said first lateral direction being effective to reduce said level of vibratory force transmitted along said first lateral direction.

20. Apparatus for mounting a turbine engine to a portion of an aircraft structure, comprising
a) at least one first elastomeric mount attachable to a front portion of said engine and said portion of an aircraft structure, said first mount being significantly softer statically in a first lateral direction than in a second lateral direction, said second lateral direction defining a primary load path for transmission of vibratory forces from said turbine engine to said portion of an aircraft structure for said first mount;
b) at least one second elastomeric mount attachable to a rear portion of said engine and said portion of an aircraft structure, said second mount being significantly softer statically in a first lateral direction than in a second lateral direction, said second lateral direction defining a primary load path for transmission of vibratory forces from said turbine engine to said portion of an aircraft structure for said second mount, said second lateral direction for said second mount being orthogonal to said second lateral direction for said first mount;
c) auxiliary means associated with each respective said second lateral direction to dynamically soften said mount in said second lateral direction to reduce or cancel vibratory forces transmitted between said engine and said portion of an aircraft structure, wherein said auxiliary means is selected from the group consisting of i) passive non-fluid means, ii) active non-fluid means, and iii) active fluid means.

21. The apparatus for mounting of claim 20 wherein said at least one first elastomeric mount and said at least one second elastomeric mount each comprise two elastomeric mounts for said engine.

* * * * *